US011459059B2

(12) United States Patent
Gendell

(10) Patent No.: US 11,459,059 B2
(45) Date of Patent: Oct. 4, 2022

(54) STRIDE EMULATOR DEVICE

(71) Applicant: Alexander Gendell, Hoboken, NJ (US)

(72) Inventor: Alexander Gendell, Hoboken, NJ (US)

( * ) Notice: Subject to any disclaimer, the term of this patent is extended or adjusted under 35 U.S.C. 154(b) by 0 days.

(21) Appl. No.: 16/948,424

(22) Filed: Sep. 17, 2020

(65) Prior Publication Data

US 2021/0078672 A1 Mar. 18, 2021

Related U.S. Application Data

(60) Provisional application No. 62/902,331, filed on Sep. 18, 2019.

(51) Int. Cl.
*B62M 3/00* (2006.01)
*B62M 1/24* (2013.01)
*B62M 3/06* (2006.01)
*B62M 1/30* (2013.01)

(52) U.S. Cl.
CPC ............... *B62M 3/06* (2013.01); *B62M 1/30* (2013.01)

(58) Field of Classification Search
CPC . B62M 1/24; B62M 1/26; B62M 1/28; B62M 1/30; B62M 3/06; B62M 2003/006
See application file for complete search history.

(56) References Cited

U.S. PATENT DOCUMENTS

| | | | | |
|---|---|---|---|---|
| 594,980 | A * | 12/1897 | Scott | B62M 1/26 280/253 |
| 4,029,334 | A * | 6/1977 | Trammell, Jr. | B62M 1/26 280/261 |
| 5,351,979 | A * | 10/1994 | Langen | B62K 21/00 280/254 |
| 8,146,938 | B2 * | 4/2012 | Gobillard | B62M 1/36 280/259 |
| 8,210,553 | B2 * | 7/2012 | Fan | B62K 3/002 280/221 |
| 8,857,840 | B2 * | 10/2014 | Scolari | B62M 1/26 280/256 |
| 9,079,632 | B2 * | 7/2015 | Gendell | B62M 6/70 |
| 10,220,911 | B2 * | 3/2019 | Ascher | B62M 1/38 |

FOREIGN PATENT DOCUMENTS

CA          2832547 A1 *  5/2015   ............. B62M 1/30

* cited by examiner

*Primary Examiner* — Adam D Rogers
(74) *Attorney, Agent, or Firm* — Kaplan Breyer Schwarz, LLP

(57) ABSTRACT

A stride emulator device for efficiently utilizing human leg power for transference to a rotary drive system including a pair of levers, at least two gears, at least two crankshafts having crank arms, and where each lever includes a cam and cam track.

10 Claims, 10 Drawing Sheets

FIG. 2a  SINGLE STRIDE ANALYSIS
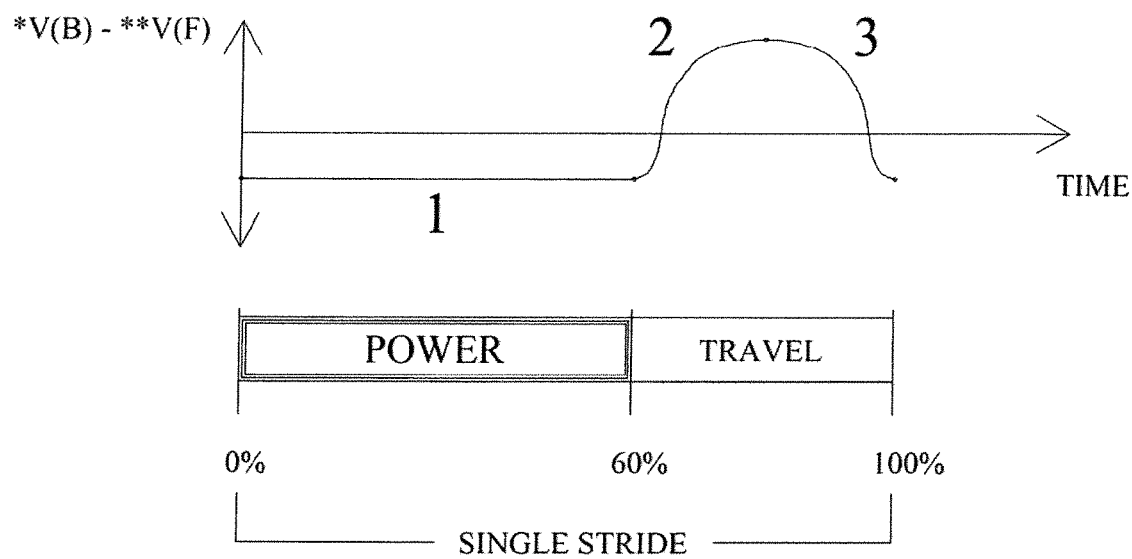
FIG. 2b  DOUBLE STRIDE ANALYSIS
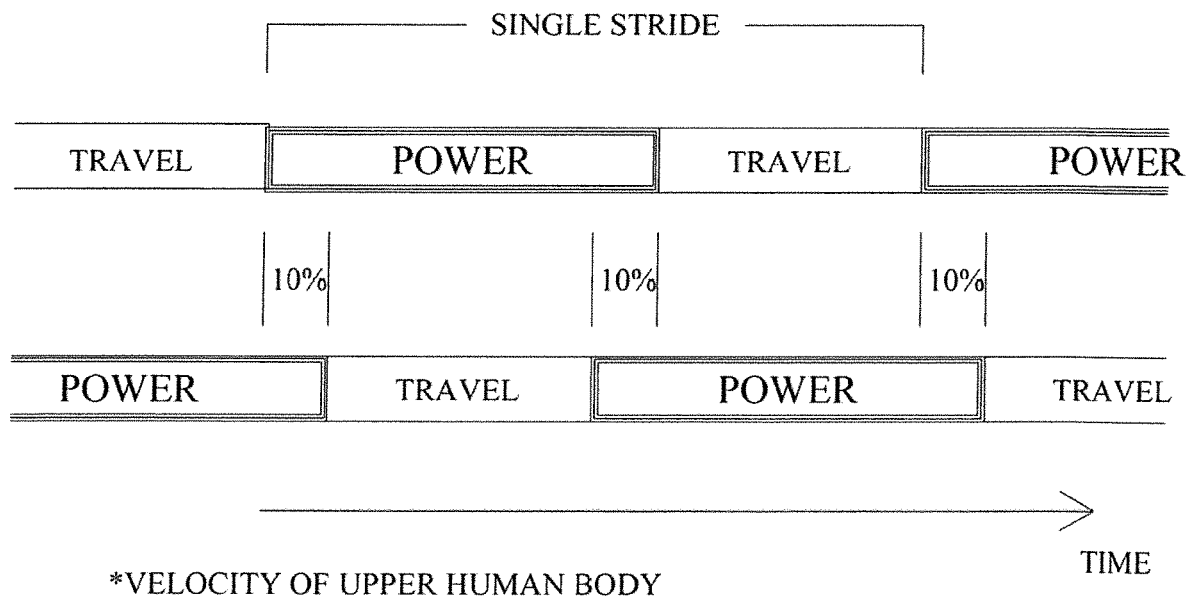
*VELOCITY OF UPPER HUMAN BODY
** VELOCITY OF FOOT

STRIDE EMULATOR DEVICE

PRIORITY

This application claims priority of U.S. Provisional Application Ser. No. 62/902,331, filed Sep. 18, 2019.

BACKGROUND OF THE INVENTION

This invention relates to conversion of linear motion into circular or rotary motion (or vice versa) and particularly to mechanisms for conversion.

When walking or climbing, our leg strokes are asymmetrical
the legs move at different speeds with relation to each other.
The leg return travel through the air, is faster than the push on the ground. The leg strokes thus overlap, and power is smoothly transferred from one leg to the other without losing continuous thrust or ground contact.

A common way of converting linear thrust to rotary motion is by means of a crank. A bicycle crank is commonly used to capture power from the legs. Unlike when walking or climbing, when spinning a crank, the legs move at the same speed relative to each other. This movement is similar to running, where the legs also move quickly at approximately the same speed. While running, the momentum (inertia) of the body traveling at higher speeds allows for "air time", so there is no need for continuous ground contact, or overlapping strokes. Similarly, the bicycle crank also relies on inertia from speed and high RPM, to pass the crank's "dead" spots.

It is well understood that successful cycling depends on a very high cadence or RPM (rotations per minute). One main reason is the pedal and crank input system. Since a crank the linear power input of a crank is intermittent, it needs high RPM to be efficient. Cycling at lower cadences and lower speeds is inherently inefficient.

Certain movements and applications require lower RPM, and cannot rely on inertia for efficiency. For example, climbing a hill—even if a crank is spinning at high RPM, the inertia from high forward speed, and rotational inertia, is not available.

The goal of the invention is to provide a mechanical system that emulates the leg movements of walking and climbing, and is able to efficiently convert power from such motion into rotation, enabling efficient transfer of power at lower input RPM.

Another goal of the invention is to create a bicycle, or exercise machine that efficiently uses, or trains slow-twitch muscle fibers which operate at lower cadences.

SUMMARY OF THE INVENTION

The present invention provides a lever mechanism which is designed to follow the motion of walking or climbing legs. The lever mechanism is characterized by a power cycle or stroke that is longer than the travel cycle or stroke, meaning that for one "rotation" of the driven gear, more than 50 percent of the time, power is being transferred to said gear. This "overlap" of power strokes allows for full linear power input 100 percent of the time. The path of the movement is very much like the movement of the leg. While pushing, the leg is travelling in a straight line. When travelling forward, the leg lifts up through the air following an "arc" shape.

Each input lever of a stride emulator according to the invention follows such a path, or "cycle". When pushing, the leg is moving almost in a straight line. When moving, it follows an arc. A stride emulator according to the invention comprises two slider cranks which are joined together (by a chain, gears, or other means) in such a way that they always rotate in the same direction by the same amount. The crank arms of each slider crank are rotated approximately 180 degrees from each other. A slightly larger or smaller angle is possible, depending on the desired input path (simulated trajectory of leg stroke).

The two slider cranks themselves are joined by shafts, so that they also are rotated 180 degrees away from each other. This way the input levers follow a walking or climbing rhythm. With a simple crank, a linear power stroke is not converted to rotation in a purely linear way. However, it is more or less efficient for about ¼ of the turn. In a stride emulator according to the invention, the linear power stroke is not only converted in a linear way, but it is also efficient during more than ½ of the turn.

More specifically, a stride emulator device is provided, having a pair of levers, comprising a first lever and a second lever, wherein said first lever includes a first cam track, and the second lever includes a second cam track, at least two gears, comprising a distal gear and a medial gear, a distal crank shaft, disposed at an axis of the distal gear, and connected to a first distal crank arm, wherein the first distal crank arm is rotatably connected to the first lever at a distal portion thereof, and wherein the distal crank shaft is connected to a second distal crank arm, wherein the second distal crank arm is rotatably connected to said second lever at a distal portion thereof, a medial crankshaft, disposed at an axis of the medial gear and in mechanical communication with a first medial crank arm, and the first medial crank arm includes a first cam slidably connected to the first cam track, and wherein the medial crankshaft is connected to a second medial crank arm, and the second medial crank arm includes a second cam and is slidably connected to the second cam track, and wherein, said first lever and said second lever are disposed on at least one side of the gears, and wherein the first distal crank arm and the first medial crank arm are offset by a first power arc angle normal to the medial axis, and wherein the second distal crank arm and the second medial crank arm are offset by a second power arc angle normal to the medial axis.

In addition, a stride emulator device is provided, having at least one force synchronization device, such as at least one gear, at least one pulley, and at least one belt, and at least one chain, whereby when a force is applied to a proximal portion of the first lever, a first rotating motion is induced upon the distal gear, and when a subsequent force is induced upon a proximal portion of the second lever following at least a partial rotation, a second rotating motion is induced upon the distal gear.

Further, a stride emulator device is provided, wherein a first lever further includes a first lever line, and wherein the first lever line tracks along a power modification cycle.

In addition, a stride emulator device is provided, wherein the first lever further comprises a power modification cycle, which includes a power phase and a travel phase.

OBJECT OF THE INVENTION

An objective of the present invention is to provide a lever operated gear transmission system for continuous and efficient energy transfer at fixed and variable gear ratios. Specific examples are included in the following description for purposes of clarity, but various details can be changed within the scope of the present invention.

Another object of the invention is to provide a lever powered mechanism adapted to an exercise machine.

Another object of the invention is to provide a lever mechanism that converts rotation into walking motion, for use in robotics.

Another object of the invention is to provide a lever mechanism that converts rotation into walking motion, for training purposes, similar to a stair climbing machine or treadmill.

Another object of the invention is to provide a lever powered mechanism adapted to other forms of human powered vehicles, such as boats, aircraft, etc. Another object of the invention is to provide a lever powered mechanism having variable gear ratio adapted for powering a bicycle.

It is another object of the invention to provide a better manual winch.

A further object of the invention is to provide a better pump system.

Other and further objects of the invention will become apparent with an understanding of the following detailed description of the invention or upon employment of the invention.

BRIEF DESCRIPTION OF THE DRAWINGS

A preferred embodiment of the invention has been chosen for detailed description to enable those having ordinary skill in the art to which the invention appertains to readily understand how to construct and use the invention and is shown in the accompanying drawings in which:

FIG. 2a is a diagram representing relative velocity of body movement and foot movement over time.

FIG. 2b is a diagram representing relative velocity of body movement and foot movement over time.

DETAILED DESCRIPTION

Figure 1:
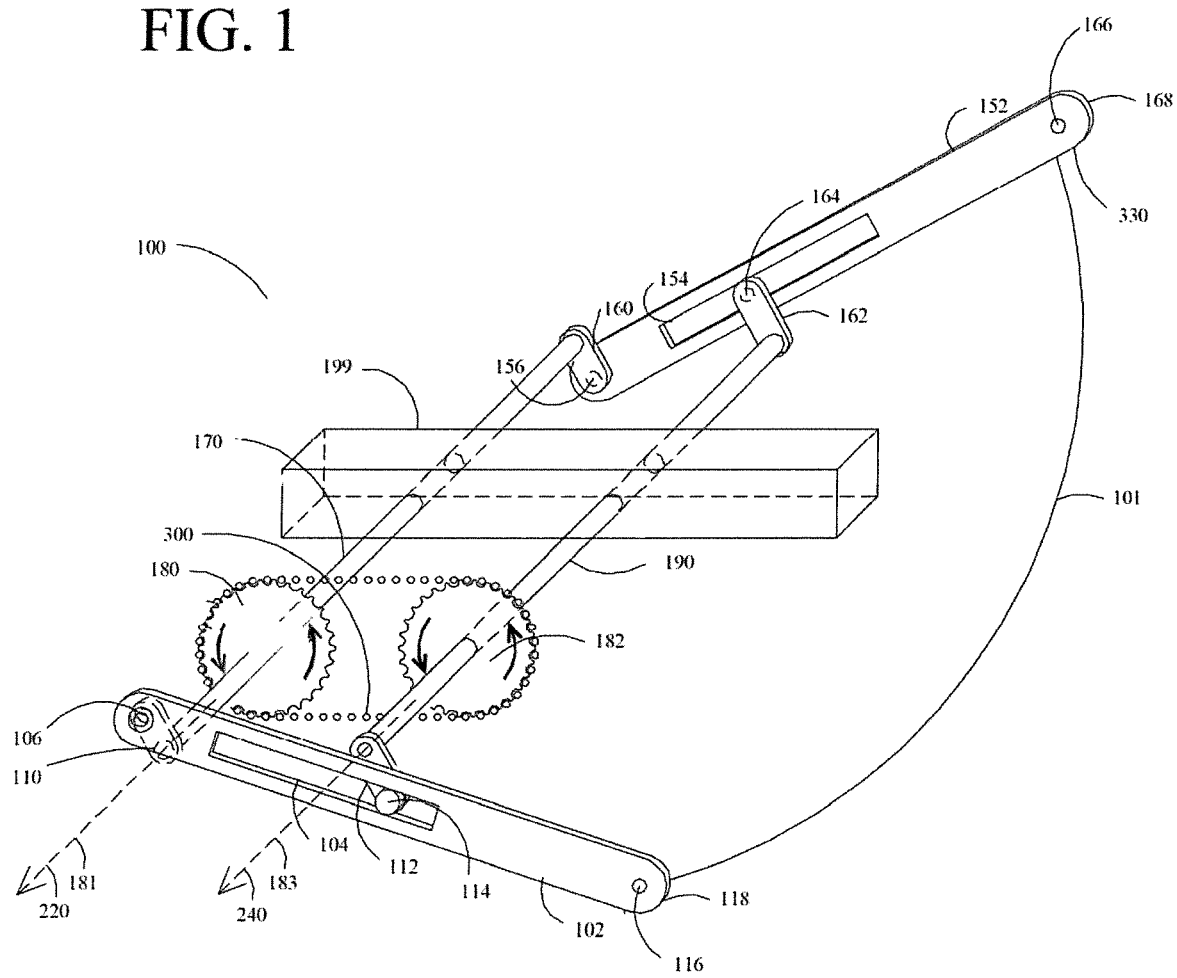
FIG. 1 is a diagram representing perspective view an embodiment of the stride emulator according to the invention.

A preferred embodiment of a stride emulator device 100, in accordance with the invention is shown in FIG. 1. An embodiment of the stride emulator device 100 includes a pair of levers 101, comprising a first lever 102 and a second lever 152. Each lever includes a cam track 104, 154. The cam track can be formed as a track attached to the lever, or as a recessed portion running along the length of the lever or simply an aperture that runs along the length of the lever, among other things.

In addition, the stride emulator device 100 includes at least two gears, namely a distal gear 180 and a medial gear 182, and a distal crank shaft 170. A distal crankshaft is attached to a center, i.e. a distal axis 181 of the distal gear, such that when the gear rotates, rotary power is transferred to the crankshaft and vice versa.

The distal crankshaft 170 is connected to a first distal crank arm 110, which is in turn is rotatably connected to the first lever 102 at one end of the lever, such as by using a pivot, screw, or the rotating joint at a distal portion 106 of the lever. Thus, the distal crankshaft 170 forms a rotating support for one end of the lever which moves in accordance with the length of the first distal crank arm.

In addition, the distal crank shaft 170 is connected to a second distal crank arm 160, which is in turn is rotatably connected to the second lever 152 at one end of the lever, such as by using a pivot, screw, or the rotating joint at a distal portion 156 of the lever. Thus, the distal crankshaft 170 forms a rotating support for one end of the lever which moves in accordance with the length of the first distal crank arm.

Furthermore, a medial crankshaft 190 is provided and attached to a center, i.e., a medial axis 183 of the medial gear 182, such that when the gear rotates, rotary power is transferred to the crankshaft and vice versa.

In addition, the medial crank shaft 190 is connected to a first medial crank arm 112, which is in turn is rotatably connected to the first cam track 104 by a rotatable support such as a first cam 114. Thus, the medial crankshaft forms a rotating support at the end of the medial crank arm for the first lever, where the cam supports, rotates and slides along the first cam track 104 of the first lever in accordance with the length of the first distal crank arm and length and position of the first cam track 104. Thus, the first medial crank arm includes a first cam slidably connected to the first cam track, and alternatively can include other means such as a pin, shuttle, or other sliding means of connection.

Likewise, the medial crankshaft 190 is in mechanical communication with a second medial crank arm 162, which similarly includes a second cam 164 that is slidably connected to the second cam track 154 of the second lever.

Preferably each set of levers and associated elements are mirror images of each other. In one embodiment, the first lever and the second lever are placed on either side of the gears, but it can be appreciated that the relative location of the various elements can be adjusted in accordance with the intended function of the device, and a person of ordinary skill in the art can adapt the relative locations, size, and combination of the various elements described herein in accordance with the teachings of this invention in order to realize the intended benefits of such a device according to the invention.

For example, in a preferred embodiment of a stride emulator device 100 according to the invention, a first distal crank arm and a first medial crank arm are offset in their initial starting position by a first power arc angle normal to the medial axis, or a first axial direction 220. The first power arc angle is the difference in angle of the distal and medial crank arms. It can be 180.degree., which is a basic position, and can be reduced from 180.degree. to approximately 70°. For example, in an embodiment where the gears are of a same diameter and are mechanically connected, such as by an intermediate gear 300, 510 or other force synchronization device 300, each gear will move at the same rate, and thereby rotate each crank arm at a same rate. In a simple case, each crank arm can be positioned in the same relative directions, i.e., they are synchronized. However, to achieve the objects of the invention, a person of ordinary skill in the art may modify the starting position an offset one of the crank arms with respect to the other, as will be further explained herein.

Similarly, a stride emulator device is provided with the second distal crank arm being offset by a second power arc angle normal to the medial axis, or a second axial direction 240.

A frame 199 can also be provided to support the stride emulation device 100 and provide a framework through which the gears rotate, and can be connected to other elements of a bike, exercise machine, or other machine as a person of ordinary skill in the art desires to utilize the function of the instant invention.

FIG. 2a is a diagram representing relative velocity of body movement and foot movement over time, as a way to show the benefits of the instant invention. In a first phase of a stride, a foot provides constant power to the body over time when in contact with the ground, and can be represented as Vb-Vf. In second phase when a foot is raised, forward, and then placed back down as a footstep, this is a "travel" phase where no work is performed and the foot must be reset ahead of the stride to provide more power. In this conceptual diagram, the amount of loss of opportunity to transfer power is 40%, but can vary greatly. As such, this diagram is not intended to convey anything more than a concept behind the invention.

Similarly, FIG. 2b is a diagram representing relative velocity of body movement and foot movement over time showing several strides in seriatim. During each stride power is transferred without break, but there is an overlap wherein power is wasted. Again, this is a conceptual diagram wherein the overlap is shown as being 10% but can vary greatly. As such this diagram is not intended to convey anything more than a concept behind the invention.

Figure 3A:
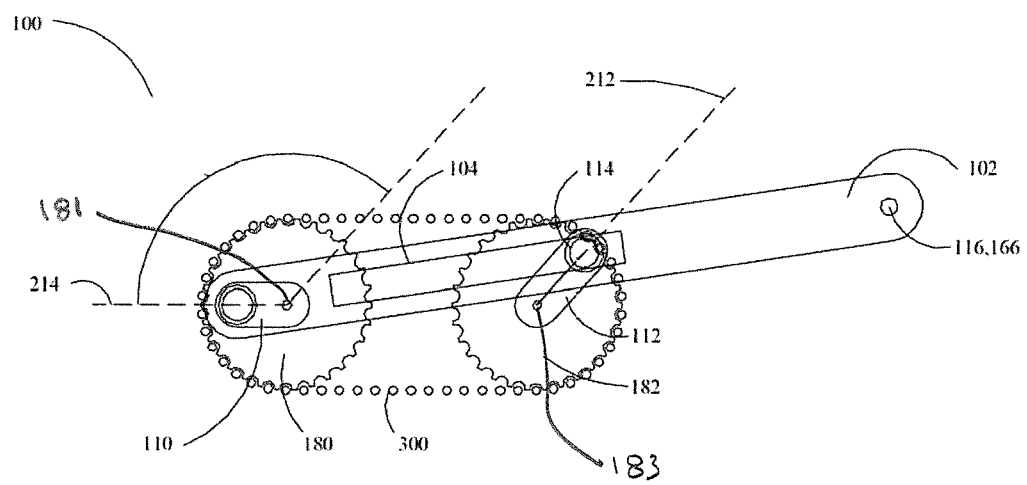
FIG. 3a is a diagram representing a side view an embodiment of the stride emulator according to the invention.
Figure 3B:
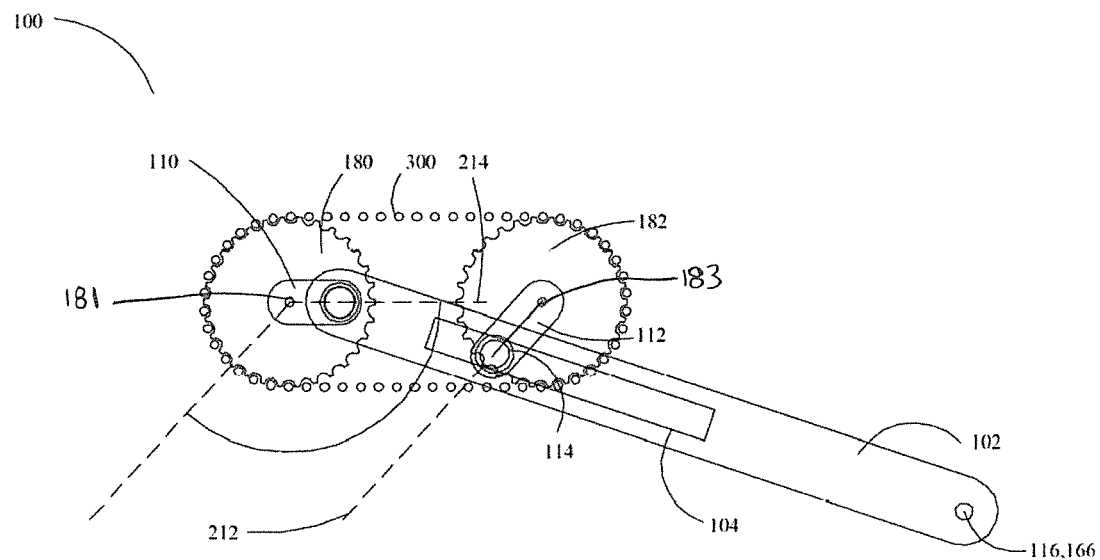
FIG. 3b is a diagram representing a side view an embodiment of the stride emulator according to the invention.

FIG. 3a and FIG. 3B are diagrams representing a side view an embodiment of the stride emulator according to the invention. In this embodiment, a chain 300 is provided for connecting the two gears as a force synchronization device 300. These two diagrams are intended to show the movement of a lever at different points of a cycle when in use. In FIG. 3a, for example, the lever is at a position where each of the crank arms are offset by a first power angle as measured by the angle between a medial crank arm line 212 and a distal crank arm line 214. It can be seen that the proximal portion 116, 166 of the lever 102 is in two different positions depending on where in the cycle the stride emulation device is provided. It can be appreciated that as each gear is rotated, each crank arm induces the lever to move in a particular cycle.

Figure 4:
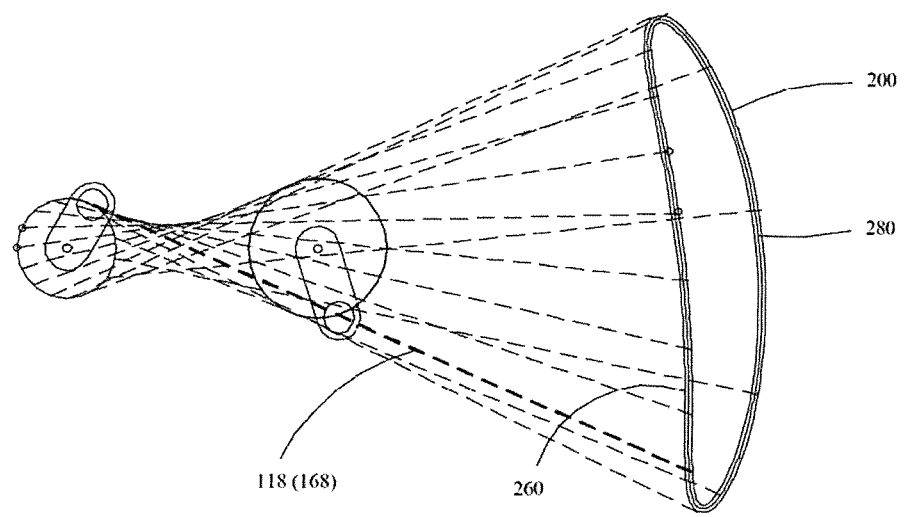
FIG. 4 a conceptual diagram representing portions of an embodiment of a stride emulator according to the invention, and a possible path or cycle as a track.

FIG. 4 is a conceptual diagram representing portions of an embodiment of a stride emulator according to the invention, and a possible path or cycle which the proximal portion 116, 166 of the lever 102 will trace. More generally, a lever line 118, 168 will trace out a cycle, namely a power modification cycle 200 as shown in the figure. The shape of the cycle is dependent upon a number of factors including the relative length of each crank arm 110, 112, 160, 162, and the separation of the gears, among other things. In one embodiment of the invention as shown in FIG. 4, the power modification cycle 200 has a travel phase 280 portion that is bowed out or convex, and a power phase 260 that is concave or bowed in. In this conceptual diagram, the lever line 118, 168 is shown as an intangible extension of the tangible lever arm that may be employed. A length of the travel phase is preferably an amount between 25.4 cm and 76.2 cm (10 and 30 inches).

Figure 5:
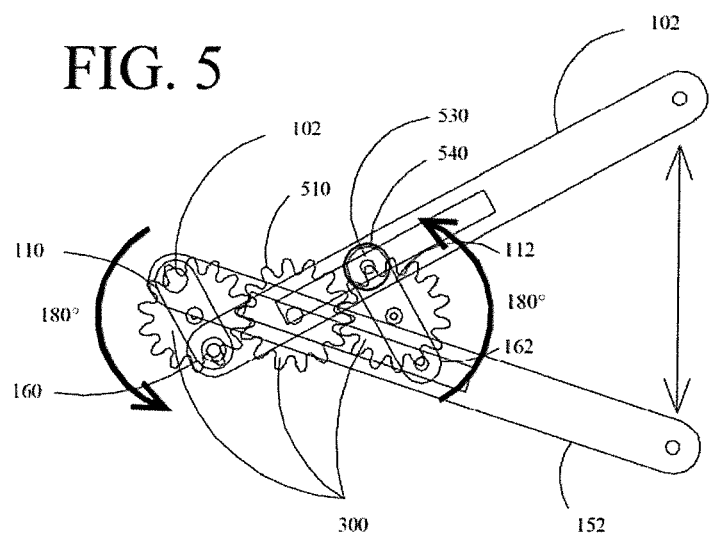
FIG. 5 is a diagram representing a side view of a portion of an embodiment of a stride emulator according to the invention having an intermediate gear and shown in two positions.

FIG. 5 is a diagram representing a side view of a portion of an embodiment of a stride emulator according to the invention having an intermediate gear 510 and shown with two levers 102, 152. In a preferred embodiment having two levers, a stride emulation device according to the invention is adapted to provide each lever with an offset position. For example, for embodiment of a stride emulator device adapted for a bicycle, the embodiment can include a left pedal and right pedal which are intermittently pushed to drive the gears. The first distal crank arm 110 is offset from the second distal crank arm 160 by 180°, and the first medial crank arm 112 is offset from the second medial crank arm 162 by 180°. A user of the device does not push a pedal around in a full circle, but rather intermittently pushes or pulls the first lever and then the second lever back and forth which then cause a very efficient transfer of energy to the gears, which can be used to drive in machine.

Figure 6:
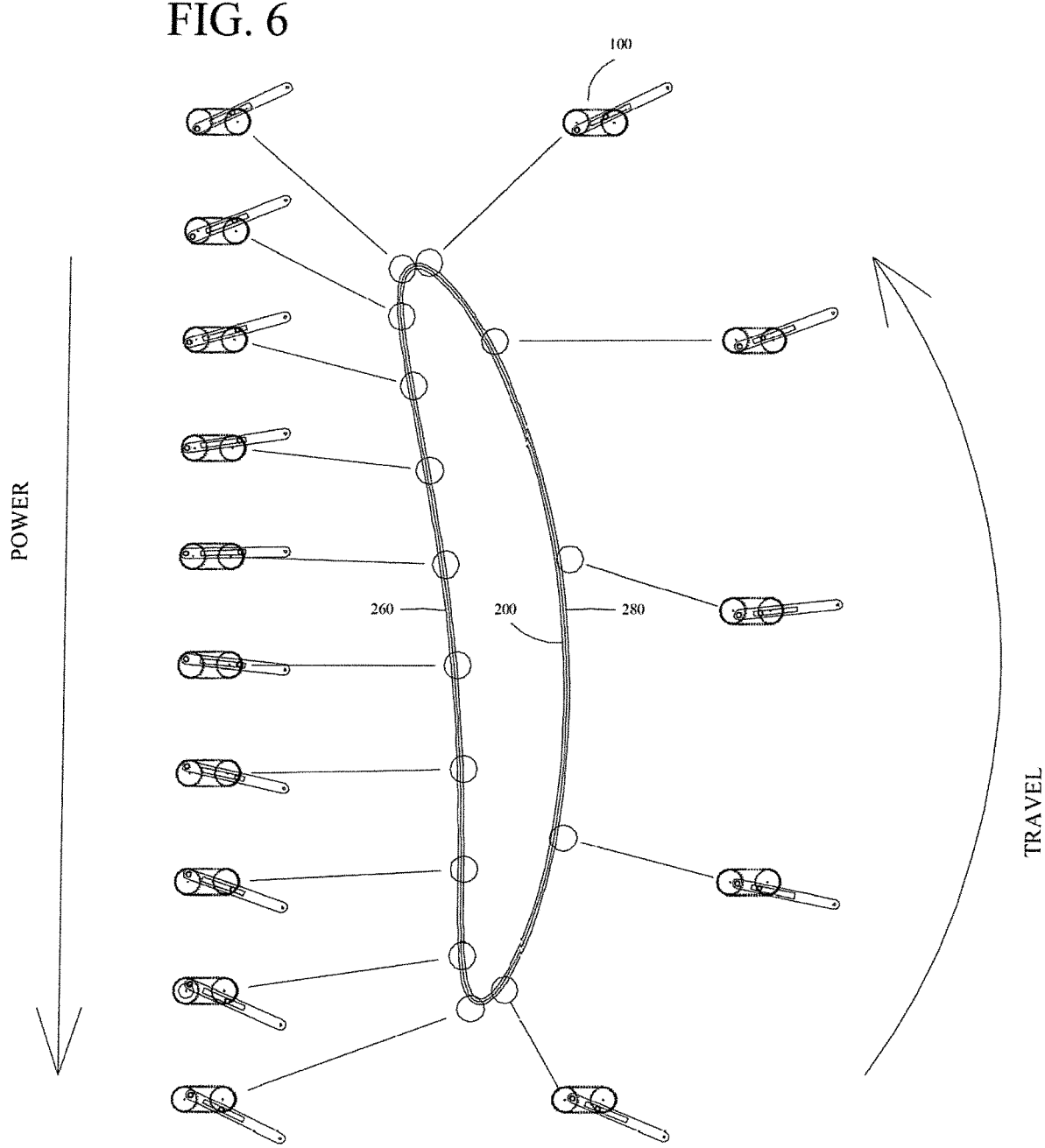
FIG. 6 is a conceptual diagram showing one possible power cycle and the relative positions of the levers of an embodiment of the stride emulator according to the invention at various points around the cycle during a power phase and a travel phase.

FIG. 6 is a conceptual diagram showing one possible power cycle 200 and the relative positions of the levers of an embodiment of the stride emulation device 100 according to the invention at various points around the cycle 200 during a power 260 phase and a travel phase 280. This conceptual diagram, not to scale, shows where a lever is located at each point along the curve of the power phase and the travel phase. It can be appreciated that depending on the configuration chosen by a person of ordinary skill in the art in the field in which the invention pertains for the particular embodiment, the shape of the power modification cycle 200 will change.

This figure shows a possible cycle 200 of one embodiment of a stride emulator. In this path, each point on the path represents a ⅕th of a rotation of the output crank. In the FIG. 6, several points at the power phase 260 are close to being on a straight line, and the distance between each adjacent point is similar. This means the same amount of linear input from these points will result in the same amount of rotation of the output crank. The arcuate path of these points on the travel phase 280 shows an acceleration and deceleration of the lever on the travel stroke. In this particular instance, the travel stroke is approximately ½ half of the time of the power stroke. It can be appreciated that when both lever arms are connected to the crank axes, an overlap of power strokes will occur where power can be transferred from one input lever to the other.

The ratio of power to travel stroke is determined by the pivot locations of the cranks, and by the distance between the cranks. There are multiple arrangements possible, depending on how much overlap is desired and the desired shape of the stroke. It is also possible to offset the angle between the two cranks slightly, which results in a slightly asymmetrical path. The length of the lever arm also affects the shape of the path. Also, by extending the lever arm in the opposite direction, it is possible to change the shape of the path in a way that the power segment has an arc shape, and the travel segment is more of a straight line. Alternatively, if the cam track extends to the second crank, a locking mechanism, such as a cam lock 530 (shown in FIG. 5) can alternately secure the front or rear crank, it is possible to switch between a mode that emulates walking, and a mode that emulates a movement such as skating or leaping, where the pushing of the leg is faster than the travel forward. It is also possible to further control the path by altering the shape of the cam track, so that it is not a perfectly straight line non-linear, such as an arc. In addition, or in the alternative, an embodiment of the emulator device 100 according to the invention can include a medial arm shift 540 and a distal arm shift 520 for modifying the power cycle 200 on the fly. The medial arm shift 540 and distal arm shift 520 can be provided as telescoping arms which change in length when provided with a signal from a gear shift (not shown), or they can be set and adjusted manually before use. The medial arm shift 540 and a distal arm shift 520 should shift lengths complementary directions so as to prevent undue strain on the force synchronization device 300.

Figure 7A:
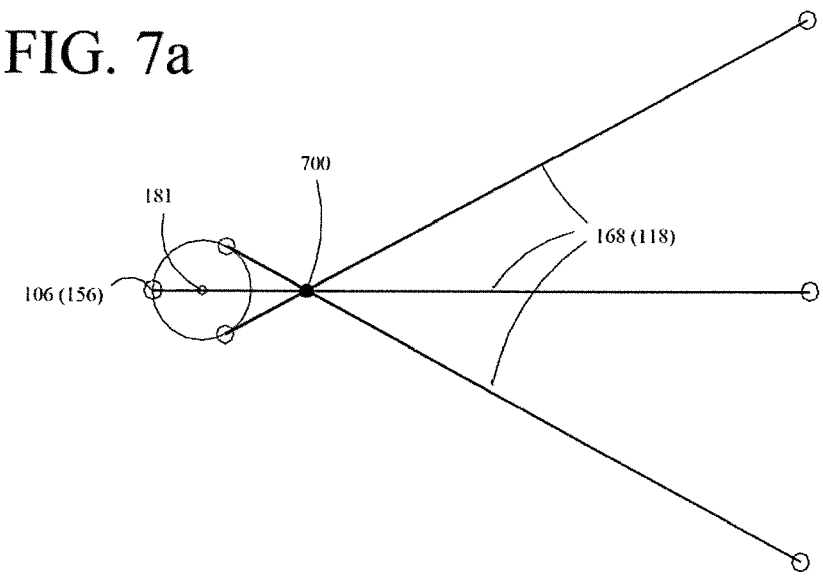
FIG. 7a is a conceptual diagram showing various factors for designing a desired power cycle which can be implemented in an embodiment of a stride emulator according to the invention.
Figure 7B:
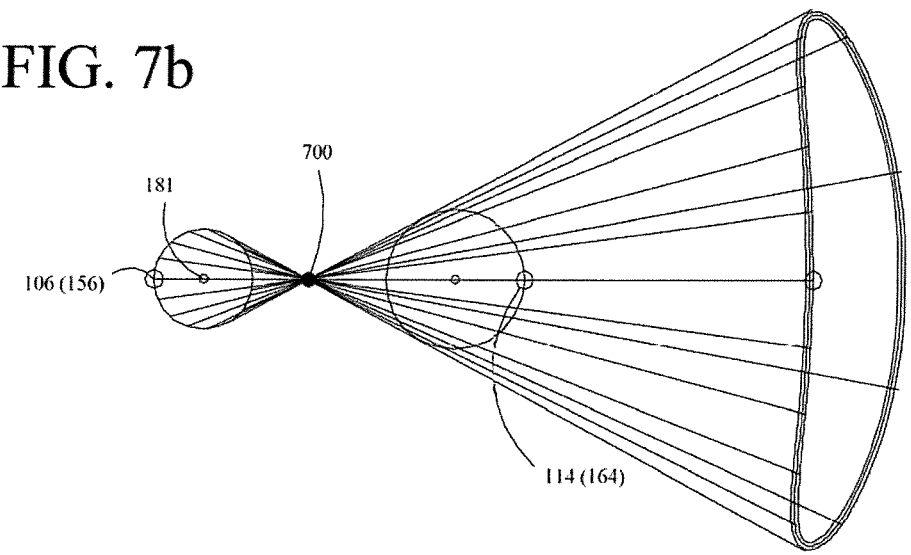
FIG. 7b is a conceptual diagram showing various factors for designing a desired power cycle which can be implemented in an embodiment of a stride emulator according to the invention.
Figure 7C:
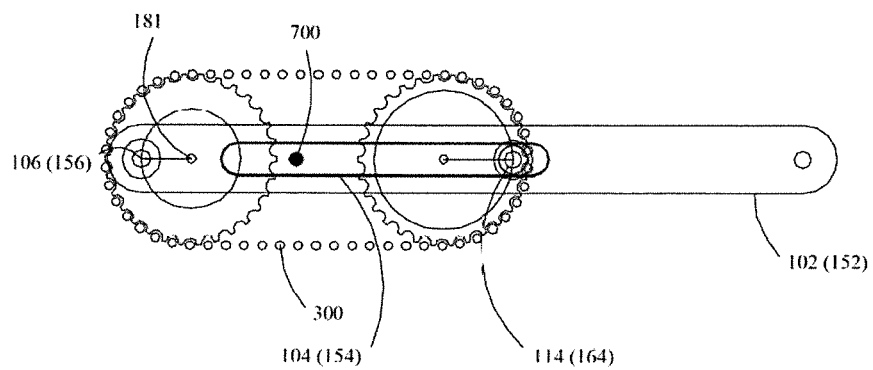
FIG. 7c is a diagram representing a side view of an embodiment of a stride emulator according to the invention.

FIG. 7a, 7b, 7c are conceptual diagrams showing various factors for designing a desired power cycle which can be implemented in an embodiment of a stride emulator according to the invention to assist a person of ordinary skill in the art to choose the desired configuration for an embodiment of their choice having a particular power cycle 200 characteristic, along with a side view of an embodiment of a stride emulator according to the invention.

As shown in FIGS. 7a, 7b, and 7c, a hypothetical focal point 700 is provided where the several lever line extensions 118, 168 intersect. For example, as shown in FIG. 7a starting with a single gear with a distal axis 181 and a particular lever arm length which defines a diameter of travel of the distal portion 106, 156 of the lever, a focal point 700 is defined by the tangents at two points which provide the furthest extent of the power modification cycle as it traces an arcuate path.

Providing a second lever arm and cam track in FIG. 7b, provides additional constraints and provides definition to the arcuate path of the power modification cycle 200.

Accordingly, when designing a machine to utilize a power modification cycle, one may back into the desired configuration of the stride emulation device 100 by first choosing a lever length and/or lever line extension 118, 168, and secondly choosing a desired power modification cycle characteristic 200. For example, one may design a bike for individuals with shorter or longer leg lengths or strides, and thereby provide an optimal system adapted to a particular individual for most efficiency and transferring power to the device.

Figure 8A:
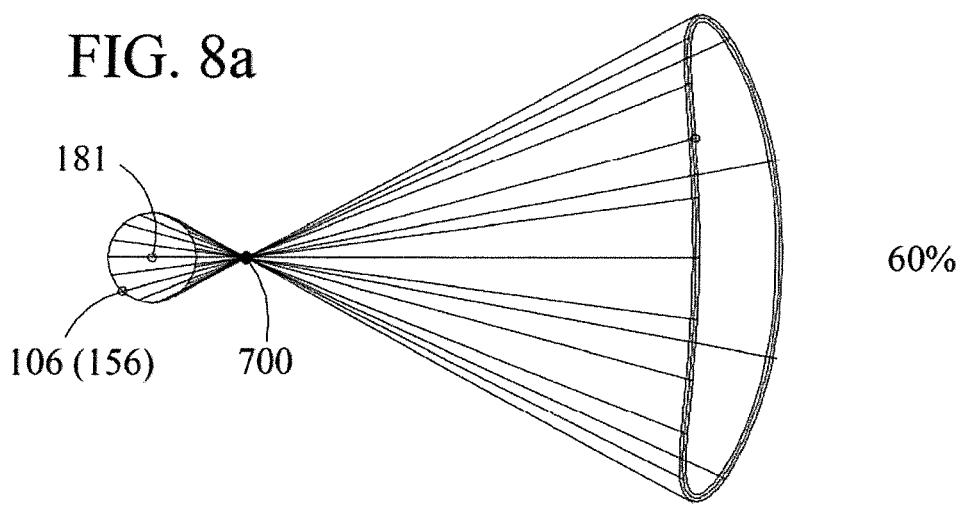
FIG. 8a is a conceptual diagram showing various factors for designing a desired power cycle which can be implemented in an embodiment of a stride emulator according to the invention having a travel to power phase ratio of 60%.
Figure 8B:
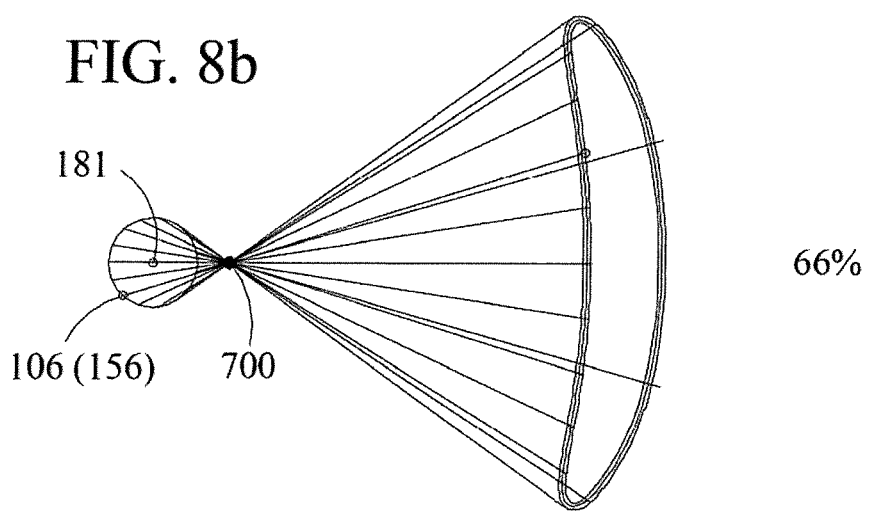
FIG. 8b is a conceptual diagram showing various factors for designing a desired power cycle which can be implemented in an embodiment of a stride emulator according to the invention having a travel to power phase ratio of 66%.
Figure 8C:
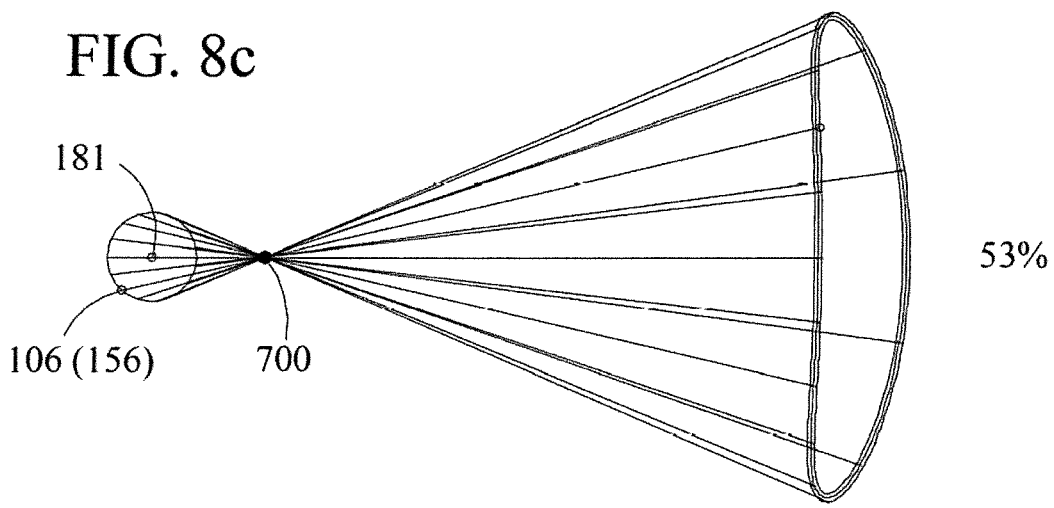
FIG. 8c is a conceptual diagram showing various factors for designing a desired power cycle which can be implemented in an embodiment of a stride emulator according to the invention having a travel to power phase ratio of 53%.

It can be appreciated by it one with ordinary skill in the art that various power modification cycles are possible, and ratio of power and travel and be modified depending on particular applications. Accordingly, FIGS. 8a, 8b, and 8c are conceptual diagrams showing various factors for designing a desired power cycle which can be implemented in an embodiment of a stride emulator according to the invention having a travel to power phase ratio of 60%, 66%, and 53%.

It is within the scope of this invention that several stride emulation devices can be employed to emulate a shifting of gears for more powerful systems. For example, a first power modification cycle 200 for a first stride emulation device 100 is adapted for use with an additional stride emulation device 1000 and its associated additional power modification cycle 2000 whereby a step up in power can be achieved by shifting from one gear system to the other. For example, in an alternative embodiment, a device 100 having a first configuration shown in FIG. 3a can be connected to a further device having a second configuration, such as shown in FIG. 3b. Each device has a different configuration, i.e., gear size focus location, lever length, etc., and thus in combination would acquire a new, and unique power cycle 200.

Figure 9:
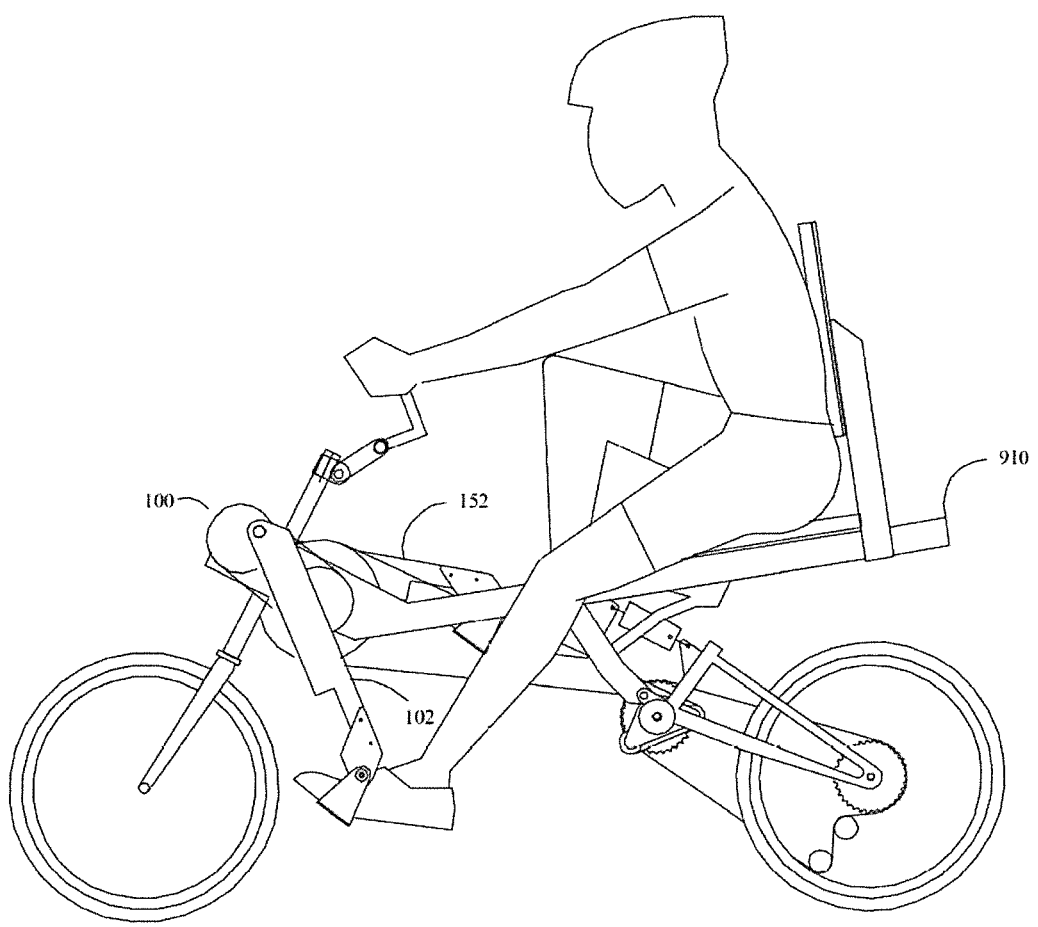
FIG. 9 is a side view of an embodiment of a bike adapted for a stride emulator device according to the invention with a hypothetical human user.

FIG. 9 is a side view of an embodiment of a bike 910 adapted for a stride emulator device according to the invention with a hypothetical human user. The bicycle is adapted where a stride emulator 100 replaces the traditional crank as a means of power input. In this drawing, a series of chains linking one of the stride simulator cranks to the rear wheel is shown. It can be appreciated that other means of transferring power are possible, to the front wheel as well. It is also possible to use the stride emulator mechanism, as a means of synchronizing inputs, rather than harvesting rotational output.

Figure 10A:
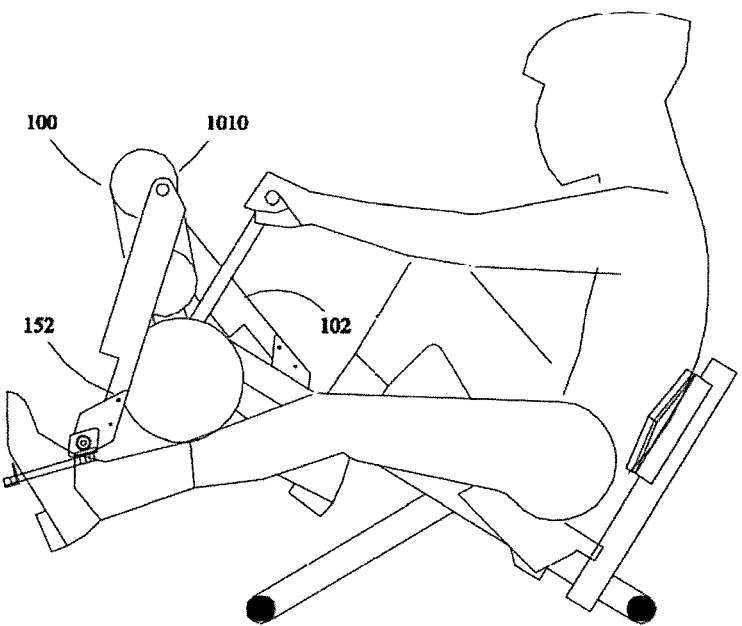
FIG. 10a is a diagram representing a side view of an embodiment of an exercise machine adapted for a stride emulator device according to the invention with a hypothetical human user.
Figure 10B:
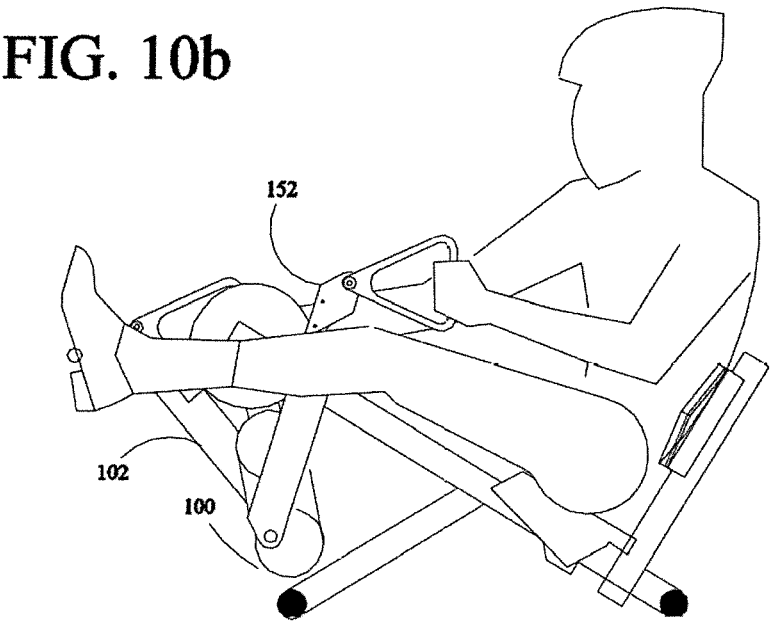
FIG. 10b is a diagram representing a side view of an embodiment of an exercise machine adapted for a stride emulator device according to the invention with a hypothetical human user.

FIGS. 10a and 10b are diagrams representing a side view of an embodiment of an exercise machines 1010 adapted for a stride emulator device according to the invention with a hypothetical human user.

Different applications of the invention include a training device or exercise machine, a pump, a folding bicycle, a cargo bike, a watercraft, among other things.

Various changes may be made to the structure embodying the principles of the invention. The foregoing embodiments are set forth in an illustrative and not in a limiting sense. The scope of the invention is defined by the claims appended hereto.

I claim:

1. A stride emulator device, comprising:
a pair of levers, comprising a first lever and a second lever, wherein said first lever includes a first cam track, and said second lever includes a second cam track;
at least two gears, comprising a distal gear and a medial gear;
a distal crankshaft, disposed at a distal axis of the distal gear, and in mechanical communication with a first distal crank arm, wherein said first distal crank arm is rotatably connected to said first lever at a distal portion thereof, wherein said distal crankshaft is in mechanical communication with a second distal crank arm, wherein said second distal crank arm is rotatably connected to said second lever at a distal portion thereof;
a medial crankshaft, disposed at a medial axis of the medial gear and is in mechanical communication with a first medial crank arm, wherein said first medial crank arm includes a first cam slidably connected to said first cam track, wherein said medial crankshaft is in mechanical communication with a second medial crank arm, and said second medial crank arm includes a second cam and is slidably connected to said second cam track, wherein, said first lever and said second lever are disposed on at least one side of said gears, wherein each of said first lever and said second lever further comprises a power modification path that a proximal portion of the first lever traces, wherein said power modification path includes a power phase and a travel phase, wherein said power phase has lesser curvature than the travel phase, and wherein said power phase has a linear characteristic and said travel phase has an arcuate characteristic.

2. A stride emulator device according to claim 1 further comprising at least one force synchronization device selected from the group consisting of at least one gear, at least one pulley, at least one belt, and at least one chain, whereby when a force is applied to said proximal portion of the first lever, a first rotating motion is induced upon said distal gear, and when a subsequent force is induced upon a proximal portion of the second lever following at least a partial rotation, a second rotating motion is induced upon said distal gear.

3. A stride emulator device according to claim 2 wherein said at least one force synchronization device comprises an intermediate gear in mechanical communication to said distal gear and said medial gear, wherein force transmitted from said distal gear to said intermediate gear is further transmitted to said medial gear.

4. A stride emulator device according to claim 1 wherein said first distal crank arm and said second distal crank arm are offset by 180°.

5. A stride emulator device according to claim 1 wherein said first medial crank arm and said second medial crank arm are offset by 180°.

6. A stride emulator device according to claim 1 wherein said power modification path is asymmetrical.

7. A stride emulator device according to claim 1 wherein each of said first cam track and said second cam track is linear.

8. A stride emulator device, comprising:
a pair of levers, comprising a first lever and a second lever, wherein said first lever includes a first cam track, and said second lever includes a second cam track;
at least two gears, comprising a distal gear and a medial gear;
a distal crank shaft, disposed at a distal axis of the distal gear, and in mechanical communication with a first distal crank arm, wherein said first distal crank arm is rotatably connected to said first lever at a distal portion thereof, wherein said distal crank shaft is in mechanical communication with a second distal crank arm, wherein said second distal crank arm is rotatably connected to said second lever at a distal portion thereof;
a medial crankshaft, disposed at a medial axis of the medial gear and is in mechanical communication with a first medial crank arm, wherein said first medial crank arm includes a first cam slidably connected to said first cam track, wherein said medial crankshaft is in mechanical communication with a second medial crank arm, and said second medial crank arm includes a second cam and is slidably connected to said second cam track, wherein, said first lever and said second lever are disposed on at least one side of said gears, and wherein a length of a travel phase is selected from an amount between 10 and 30 inches.

9. A stride emulator device, comprising:
a pair of levers, comprising a first lever and a second lever, wherein said first lever includes a first cam track, and said second lever includes a second cam track;
at least two gears, comprising a distal gear and a medial gear;
a distal crank shaft, disposed at a distal axis of the distal gear, and in mechanical communication with a first distal crank arm, wherein said first distal crank arm is rotatably connected to said first lever at a distal portion thereof, wherein said distal crank shaft is in mechanical communication with a second distal crank arm, wherein said second distal crank arm is rotatably connected to said second lever at a distal portion thereof;
a medial crankshaft, disposed at a medial axis of the medial gear and is in mechanical communication with a first medial crank arm, wherein said first medial crank arm includes a first cam slidably connected to said first cam track, wherein said medial crankshaft is in mechanical communication with a second medial crank arm, and said second medial crank arm includes a second cam and is slidably connected to said second cam track, wherein, said first lever and said second lever are disposed on at least one side of said gears, and wherein each lever arm passes through a focal point disposed between the distal axis and the medial axis.

10. A stride emulator device, comprising:
a pair of levers, comprising a first lever and a second lever, wherein said first lever includes a first cam track, and said second lever includes a second cam track;
at least two gears, comprising a distal gear and a medial gear;
a distal crank shaft, disposed at a distal axis of the distal gear, and in mechanical communication with a first distal crank arm, wherein said first distal crank arm is rotatably connected to said first lever at a distal portion thereof, wherein said distal crank shaft is in mechanical communication with a second distal crank arm, wherein said second distal crank arm is rotatably connected to said second lever at a distal portion thereof;
a medial crankshaft, disposed at a medial axis of the medial gear and is in mechanical communication with a first medial crank arm, wherein said first medial crank arm includes a first cam slidably connected to said first cam track, wherein said medial crankshaft is in mechanical communication with a second medial crank arm, and said second medial crank arm includes a second cam and is slidably connected to said second cam track, wherein, said first lever and said second lever are disposed on at least one side of said gears, and wherein said first lever includes a cam lock.

* * * * *